Patented Aug. 12, 1941

UNITED STATES PATENT OFFICE 2,251,947

AZO COMPOUND AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application December 16, 1939, Serial No. 309,688

16 Claims. (Cl. 260—155)

This invention relates to new azo compounds and their application to the art of dyeing or coloring. More particularly it relates to azo dye compounds free from nuclear sulfonic- and carboxylic acid groups which are particularly advantageous for dyeing or coloring organic derivatives of cellulose, especially cellulose acetate silk. The present application is in part a continuation of our prior application Serial No. 282,526, filed July 1, 1939.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

It is an object of our invention to provide a new class of azo compounds suitable for the dyeing or coloration of organic derivatives of cellulose. Another object is to provide a process for the dyeing or coloration of organic derivatives of cellulose. A further object is to provide dyed organic derivatives of cellulose textile materials which are of good fastness to light and washing. Other objects will hereinafter appear.

The azo compounds by means of which the above objects are accomplished or made possible are selected from the group consisting of azo compounds having the general formulae:

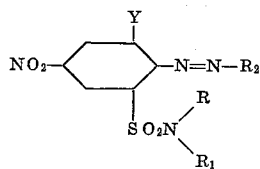

and

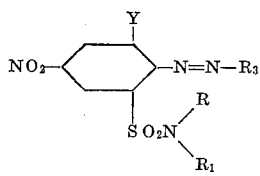

wherein R and R₁ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and $$-SO_2N\begin{matrix}R\\R_1\end{matrix}$$

wherein R and R₁ have the meaning above given, R₂ represents the residue of a tetrahydroquinoline nucleus and R₃ represents the residue of a phenmorpholine nucleus, said tetrahydroquinoline and phenmorpholine nuclei having their nuclear nitrogen atom substituted with an alkyl group.

While our invention relates broadly to the azo compounds having the above formulae, it relates more particularly to those selected from the group consisting of azo compounds having the general formulae:

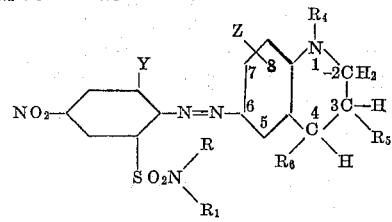

and

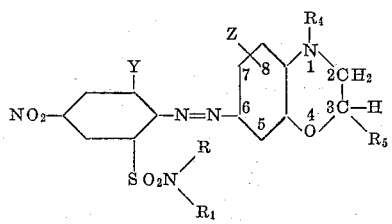

wherein R and R₁ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and $$-SO_2N\begin{matrix}R\\R_1\end{matrix}$$

wherein R and R₁ have the meaning above given, R₄ represents an alkyl group, R₅ and R₆ each represents a member selected from the group consisting of hydrogen, alkyl and amino, wherein each of the hydrogen atoms attached to the carbon atoms of the tetrahydroquinoline nucleus numbered 2, 3 and 4 and each of the hydrogen atoms attached to the carbon atoms of the phenmorpholine nucleus numbered 2 and 3 can be replaced by an alkyl group and wherein Z means that the benzene nuclei indicated can be substituted with a member selected from the group consisting of halogen, alkyl and alkoxy.

The azo compounds of our invention containing no nuclear sulfonic- or carboxylic acid group constitute a valuable class of compounds for the coloration of organic derivatives of cellulose, especially cellulose acetate silk. These compounds likewise possess utility for the dyeing of wool and silk. The nuclear sulfonated compounds of our invention possess little or no utility for the coloration of organic derivatives of cellulose but can be employed to dye silk and wool. The nuclear carboxylated compounds are ordinarily not as advantageous as the non-carboxylated compounds for coloring organic derivatives of cellulose. They similarly can be employed to color silk and wool.

The colorations obtained in accordance with our invention are of good fastness to light and washing. Further, by means of the compounds of our invention, blue dyeings on cellulose acetate silk of good fastness to light and washing and of good dischargeability can be obtained. This latter advantage constitutes a considerable technical advance in the art since, so far as we are aware, prior attempts to provide azo dyes which dye cellulose acetate silk desirable blue shades of good fastness to light and washing and of good dischargeability have not been successful; consequently there is a real need for such dyes in the art. Of all the dyes we have investigated that prepared by coupling diazotized 1-amino-2,4-dinitro-benzene-6-sulfon ethylamide with N-glyceryl-7-methyl-tetrahydroquinoline appears to be most advantageous. Also, in addition to the foregoing, the dye compounds of our invention possess excellent affinity for cellulose acetate silk dyeing this material rapidly at temperatures as low as 60–65° C.

The azo compounds of our invention can be prepared by diazotizing an amine having the general formula:

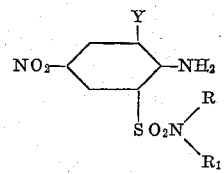

wherein R, $R_1$ and Y have the meaning previously assigned to them and coupling the diazonium compound obtained with a member selected from the group consisting of a tetrahydroquinoline nucleus and a phenmorpholine nucleus, said tetrahydroquinoline and phenmorpholine nuclei having their nuclear nitrogen atom substituted with an alkyl group.

For purposes of clarity a number of terms are defined and illustrated hereinafter. It will be understood that these terms, as used herein and in the claims, unless otherwise indicated, have the meaning assigned to them. The term "alkyl" includes not only unsubstituted alkyl groups such as a methyl group, an ethyl group, a propyl group, or a butyl group, but also substituted alkyl groups such as β-hydroxyethyl, β-hydroxypropyl, β,γ-hydroxypropyl, γ-hydroxypropyl, β-methoxyethyl, β-ethoxyethyl, β-chloroethyl, β-sulfoethyl, β-sulfopropyl, γ-sulfopropyl, β-sulfatoethyl, β-sulfatopropyl, γ-sulfatopropyl and hydroxyalkyl groups esterified to an acid ester of an acid of phosphorus such as β-phosphatoethyl, γ-phosphatoethyl, and β-phosphitoethyl.

The expression "a furyl group" includes not only the furyl group itself but also furyl derivatives such as 5-methylfuryl, 5-ethylfuryl, 5-β-hydroxyethylfuryl, 5-γ-hydroxypropylfuryl, tetrahydrofuryl, 5-methyltetrahydrofuryl, 5-ethyltetrahydrofuryl, 5-β-hydroxyethyltetrahydrofuryl and 5-γ-hydroxypropyltetrahydrofuryl.

Similarly, the expression "a phenyl nucleus" includes not only the phenyl nucleus but also phenyl nuclei substituted with substituents such as a nitro group, a halogen atom, an alkyl group, a hydroxy group or an alkoxy group.

The term "alkoxy" includes, for example, methoxy, ethoxy, propoxy, butoxy, β-methoxyethoxy and β-ethoxyethoxy. Illustrative cycloalkyl groups include cyclobutyl, cyclohexyl and cycloheptyl.

The following examples illustrate the preparation of the azo compounds of our invention:

*Example 1*

1 gram mole of 1-amino-2,4-dinitrobenzene-6-sulfon ethylamide is diazotized at a temperature of 0–5° C. with nitrosyl sulfuric acid in the usual manner. The diazonium solution resulting is poured into water and the insoluble diazo compound which precipitates out is recovered by filtration and then dissolved in acetic acid.

1 gram mole of N-glyceryl-7-methylphenmorpholine is dissolved in glacial acetic acid. The diazo solution prepared as described above is then added with stirring while maintaining a temperature of 10–20° C. The coupling reaction which takes place is completed by adding sodium acetate until the reaction mixture is no longer acid to Congo red paper. Upon completion of the coupling reaction, the mixture is poured into water and the precipitated dye compound is recovered by filtration, washed with water and dried. The dye compound obtained has the formula:

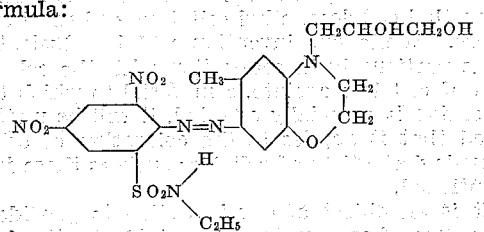

and colors cellulose acetate silk blue.

*Example 2*

1 gram mole of 1-amino-2,4-dinitrobenzene-6-sulfone-β-hydroxyethylamide is diazotized at 0–5° C. with nitrosyl sulfuric acid in the usual manner. The diazonium solution resulting is poured into water and the precipitated diazonium compound formed is recovered by filtration, and then dissolved in acetic acid.

1 gram mole of 2,7-dimethyl-N-γ-hydroxypropylphenmorpholine is dissolved in glacial acetic acid and coupled with the diazo solution prepared as described above in accordance with the method described in Example 1. The dye compound obtained has the formula:

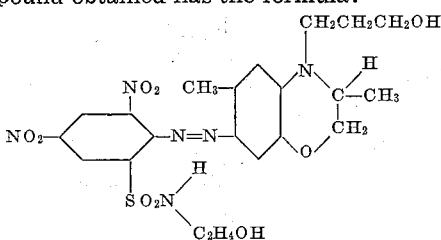

and colors cellulose acetate silk blue.

*Example 3*

1 gram mole of 1-amino-2,4-dinitrobenzene-6-sulfone propylamide is diazotized and the diazonium compound obtained is coupled with 1 gram mole of N-glyceryl-3-hydroxy-7-methyltetrahydroquinoline. The diazotization and coupling reactions may be carried out as described in Example 1. The dye compound obtained colors cellulose acetate silk blue.

*Example 4*

1 gram mole of 1-amino-2,4-dinitrobenzene-6-sulfone butylamide is diazotized in accordance with the general method described in Example 1 and the diazonium compound obtained is added to a cooled aqueous solution of N-β-sulfoethyl-7-methoxytetrahydroquinoline. During the coupling reaction which takes place the mixture is stirred and maintained at a temperature of about 10–20° C. Coupling is completed by adding sodium acetate until the reaction mixture is neutral to Congo red paper. The dye compound formed is precipitated out by the addition of sodium chloride, recovered by filtration, washed and dried. The dye compound obtained colors cellulose acetate silk blue.

*Example 5*

1 gram mole of 1-amino-2,4-dinitrobenzene-6-sulfone cyclohexylamide is diazotized in accordance with the method described in Example 1 and the diazonium compound obtained is coupled with 1 gram mole of N-ethyl-4-methyltetrahydroquinoline. Coupling and recovery of the dye compound formed may be carried out as described in Example 1. The dye compound obtained colors cellulose acetate silk purple.

*Example 6*

1 gram mole of 1-amino-4-nitrobenzene-6-sulfone allyl-amide is diazotized in accordance with the method described in Example 1 and the diazonium compound resulting is coupled with 1 gram mole of N-β-methoxyethyl-3-methyltetrahydroquinoline. Coupling and recovery of the dye compound formed can be carried out in accordance with the general method described in Example 1. The dye compound obtained colors cellulose acetate silk violet.

*Example 7*

1 gram mole of 1-amino-2-chloro-4-nitrobenzene-6-sulfone phenylamide is diazotized in accordance with the method described in Example 1 and the diazonium compound so prepared is coupled with 1 gram mole of N-β-hydroxyethyl-3-methyltetrahydroquinoline. Coupling and recovery of the dye compound formed can be carried out as described in Example 1. The dye compound obtained colors cellulose acetate silk violet.

*Example 8*

1 gram mole of 1-amino-2-methoxy-4-nitrobenzene-6-sulfone glycerylamide is diazotized with nitrosyl sulfuric acid in accordance with the method described in Example 1 and the diazonium compound formed is coupled with 1 gram mole of N-γ-hydroxypropyl-3-aminotetrahydroquinoline. Coupling and recovery of the dye compound formed may be carried out as described in Example 1. The dye compound obtained colors cellulose acetate silk violet.

*Example 9*

The diazonium solution of Example 1 is coupled with 1 gram mole of N-glyceryl-7-methyltetrahydroquinoline. Coupling and recovery of the dye compound formed can be carried out as described in Example 1. The dye compound obtained has the formula:

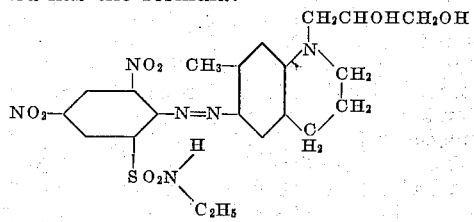

and colors cellulose acetate silk blue.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 9, inclusive.

| | Amine | Coupling component | Color |
|---|---|---|---|
| 1 | 1-amino-4-nitrobenzene-6-sulfone-di-β-hydroxyethylamide | N-butyl-7-ethoxytetra-hydroquinoline | Violet. |
| 2 | 1-amino-2,4-dinitro-benzene-6-sulfone-β-methoxyethylamide | 2,5,7-trimethyl-N-glycerylphenmorpholine | Blue. |
| 3 | 1-amino-4-nitro-benzene-6-sulfonamide | N-glyceryl-2-ethylphenmorpholine | Violet. |
| 4 | 1-amino-4-nitrobenzene-6-sulfone-n-amylamide | N-ammonium sulfatoethyl tetrahydroquinoline | Do. |
| 5 | 1-amino-2,6-di-sulfone ethylamide-β-nitrobenzene | N-glyceryl-7-methyl tetrahydroquinoline | Blue. |
| 6 | 1-amino-4-nitrobenzene-6-sulfone tetrahydrofurfurylamide | ----do---- | Violet |
| 7 | 1-amino-2,6-di-sulfone butylamide-4-nitrobenzene | N-β-hydroxypropyl-3-ethyl-7-methoxy phenmorpholine | Blue. |
| 8 | 1-amino-2,4-dinitro-benzene-6-sulfone methylamide | N-β-chloroethyl-7-ethoxy phenmorpholine | Do. |
| 9 | 1-amino-2,4-dinitrobenzene-6-sulfone methyl ethylamide | N-glyceryl-7-chlorophenmorpholine | Purple. |
| 10 | 1-amino-4-nitro-benzene-6-sulfone methylamide | N-glyceryl-7-methoxy-tetrahydroquinoline | Violet. |
| 11 | 1-amino-2-chloro-4-nitrobenzene-6-sulfone methylamide | ----do---- | Do. |
| 12 | 1-amino-2,4-dinitrobenzene-6-sulfone-β-hydroxyethylamide | ----do---- | Blue. |
| | Amines 1-20 | N-γ-methoxy-β-hydroxy-propyl-7-methyl-tetrahydroquinoline | Do. |
| 13 | 1-amino-2-chloro-4-nitrobenzene-6-sulfone glycerylamide | N-β-hydroxyethyl-tetrahydroquinoline | Violet. |
| 14 | 1-amino-2,4-dinitro-benzene-6-sulfone ethylamide | N-glyceryl-5-methyl-tetrahydroquinoline | Greenish-blue. |
| 15 | Do | N-glyceryl-5-methylphenmorpholine | Blue. |
| 16 | Do | N-glyceryl-2,5-dimethylphenmorpholine | Do. |
| 17 | 1-amino-2,4-dinitrobenzene-6-sulfone propylamide | N-β-hydroxyethoxyethyl-5-methyltetrahydroquinoline | Greenish-blue. |
| 18 | 1-amino-2,4-dinitro-benzene-6-sulfone ethylamide | N-glyceryl-7-ethyltetra-hydroquinoline | Blue. |
| 19 | Do | N-glyceryl-5-propyltetra-hydroquinoline | Do. |
| 20 | Do | N-glyceryl-7-ω-hydroxy-methyltetrahydroquinoline | Do. |
| 21 | 1-amino-2,4-dinitro-benzene-6-sulfone dibutylamide | N-sodium-β-phosphatoethyl-6-bromo tetrahydroquinoline | Red-blue. |
| 22 | 1-amino-2-bromo-4-nitrobenzene-6-sulfone methylamide | N-glyceryl-7-propoxy-phenmorpholine | Violet. |
| 23 | 1-amino-2,4-dinitrobenzene-6-sulfone ethylamide | N-glyceryl tetrahydroquinoline | Do. |
| 24 | 1-amino-4-nitro-benzene-6-sulfone dimethylamide | N-γ-methoxy-β-hydroxy-propyl-7-methyl tetrahydroquinoline | Do. |
| 25 | 1-amino-2-methyl-4-nitrobenzene-6-sulfone ethylamide | N-glyceryl-7-methoxy-tetrahydroquinoline | Do. |
| 26 | 1-amino-4-nitro-benzene-6-sulfone cetylamide | N-glyceryl-7-methoxy-phenmorpholine | Do. |
| 27 | 1-amino-2,4-dinitro-6-sulfone-β-sulfoethyl amide | N-β-hydroxyethyl-7-propyl tetrahydroquinoline | Blue. |

It will be understood that the specific compounds disclosed herein are intended to be illustrative and not limitative of our invention. Any of the amines disclosed herein, for example, can be diazotized and the diazonium compound obtained coupled with any of the coupling components shown herein to obtain compounds of our invention. Again, it will be understood that while the dye compounds of our invention have been illustrated more particularly in connection with the dyeing of cellulose acetate silk they also possess application for the coloration of other organic derivatives of cellulose as well as wool and silk dyeing these materials generally similar shades as they do cellulose acetate silk.

The amino group which can be present in the 3 and 4 positions of the tetrahydroquinoline nucleus and the 3 position of the phenmorpholine nucleus can be unsubstituted or substituted. The amino group can, for example, be substituted with an alkyl group or an acyl group such as

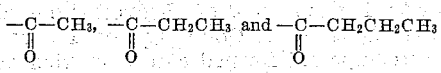

The term "amino," accordingly, as used herein and in the claims in connection with the amino group just defined includes the unsubstituted amino group as well as substituted amino groups.

In order that our invention may be completely understood, the preparation of the components employed in the production of the compounds of our invention is described or indicated hereinafter. The amine compounds are prepared by halogenating, nitrating, alkylating or sulfonating, with chlorosulfonic acid, for example, suitable aryl compounds of the benzene series, and reacting the compounds thus obtained with ammonia or various amines to obtain the desired amine compounds. To illustrate the amines having the general formula:

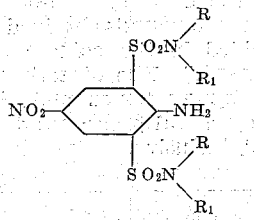

wherein R and R₁ have the meanings assigned to them can be prepared by reacting p-nitroaniline with chlorosulfonic acid and treating with ammonia, methylamine, ethylamine, ethanolamine or other amine. Compounds having the general formula:

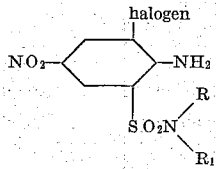

wherein R and R₁ have the meanings assigned to them can be prepared by treating 1-amino-2-halogen-4-nitrobenzene in the manner just stated.

The tetrahydroquinoline compounds of our invention can be prepared by hydrogenating quinoline or suitable quinoline derivatives in the presence of a catalyst such as Raney nickel. Substituted quinolines can be prepared from the corresponding substituted aniline compounds using the Skraup synthesis. 7-methylquinoline, for example, can be prepared from m-toluidine using this method. Compounds such as 2,2,4-trimethyltetrahydroquinoline are prepared by reacting aniline or substituted anilines with a ketone such as acetone, methylethyl ketone, diethyl ketone, etc., together with a suitable catalyst or catalysts as described in Berichte, Vol. 65, page 1511 (1932); Journal of the American Chemical Society, Vol. 55, page 2805 (1933); Berichte, Vol. 54, page 1723 (1921) and hydrogenating the dihydroalkyl substituted quinolines thus formed.

The preparation of various phenmorpholine compounds is likewise indicated hereinafter.

*Preparation of phenmorpholine*

This compound may be prepared as described in Berichte der Deutschen Chemischen Gesellschaft, vol. 22, pages 2095 and 2096.

*Preparation of 1-methylphenmorpholine*

This compound may be prepared as described in Berichte der Deutschen Chemischen Gesellschaft, vol. 22, pages 2097 and 2098.

*Preparation of 2-methylphenmorpholine*

This compound may be prepared as described in Berichte der Deutschen Chemischen Gesellschaft, vol. 30, pages 1635 and 1636.

*Preparation of 2-methyl-5-chlorophenmorpholine*

This compound may be prepared as described in Berichte der Deutschen Chemischen Gesellschaft, vol. 31, pages 754 to 758, inclusive.

Substituents identified as Z hereinbefore may be introduced into the benzene nucleus by methods customary for the introduction of the substituent desired to be introduced into a benzene nucleus by the treatment of phenmorpholine and tetrahydroquinoline compounds. The introduction of certain substituent groups has been shown above. Compounds having a hydroxyalkyl group in the 1-position of the phenmorpholine or tetrahydroquinoline nucleus can be prepared by heating phenmorpholine or tetrahydroquinoline compounds with an alkylene oxide such as ethylene oxide or propylene oxide or with a chlorohydrin such as ethylene or glyceryl chlorohydrin. 1-β-hydroxyphenmorpholine, for example, can be prepared by heating phenmorpholine with ethylene oxide.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivative of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. An azo compound selected from the group consisting of azo compounds having the general formulae:

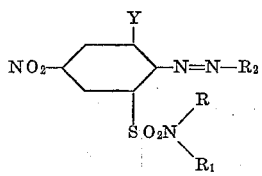

and

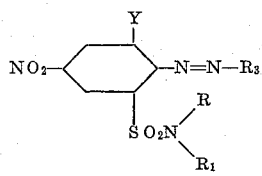

wherein R and $R_1$ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and

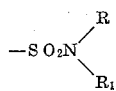

wherein R and $R_1$ have the meaning above given, $R_2$ represents the residue of a tetrahydroquinoline nucleus joined through the carbon atom in its 6 position to the azo bond shown and $R_3$ represents the residue of a phenmorpholine nucleus joined through the carbon atom in its 6 position to the azo bond shown, said tetrahydroquinoline and phenmorpholine nuclei having their nuclear nitrogen atom substituted with an alkyl group.

2. An azo compound having the general formula:

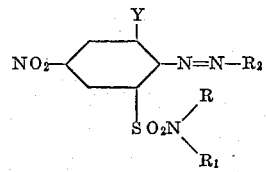

wherein R and $R_1$ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and

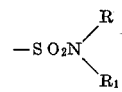

wherein R and $R_1$ have the meaning above given and $R_2$ represents the residue of a tetrahydroquinoline nucleus joined through the carbon atom in its 6 position to the azo bond shown and having its nuclear nitrogen atom substituted with an alkyl group.

3. An azo compound having the general formula:

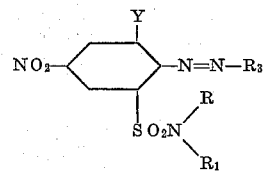

wherein R and $R_1$ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and

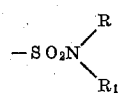

wherein R and $R_1$ have the meaning above given and $R_3$ represents the residue of a phenmorpholine nucleus joined through the carbon atom in its 6 position to the azo bond shown and having its nuclear nitrogen atom substituted with an alkyl group.

4. An azo compound selected from the group consisting of azo compounds having the general formulae:

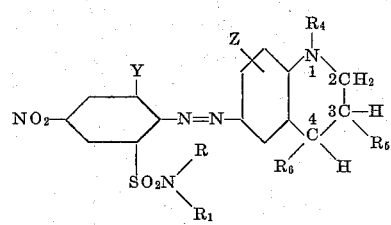

and

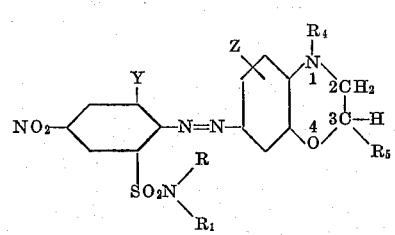

wherein R and $R_1$ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and

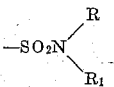

wherein R and R₁ have the meaning above given, R₄ represents an alkyl group, R₅ and R₆ each represents a member selected from the group consisting of hydrogen, alkyl and amino, wherein each of the hydrogen atoms attached to the carbon atoms of the tetrahydroquinoline nucleus numbered 2, 3 and 4 and each of the hydrogen atoms attached to the carbon atoms of the phenmorpholine nucleus numbered 2 and 3 can be replaced by an alkyl group and wherein Z means that the benzene nuclei indicated can be substituted with a member selected from the group consisting of halogen, alkyl and alkoxy.

5. An azo compound having the general formula:

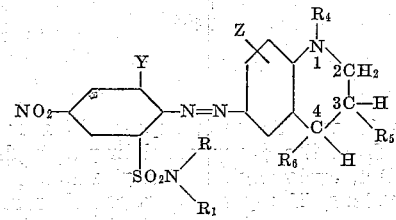

wherein R and R₁ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and

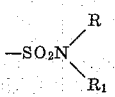

wherein R and R₁ have the meaning above given, R₄ represents an alkyl group, R₅ and R₆ each represents a member selected from the group consisting of hydrogen, alkyl and amino, wherein each of the hydrogen atoms attached to the carbon atoms of the tetrahydroquinoline nucleus numbered 2, 3 and 4 can be replaced by an alkyl group and wherein Z means that the benzene nucleus indicated can be substituted with a member selected from the group consisting of halogen, alkyl and alkoxy.

6. An azo compound having the general formula:

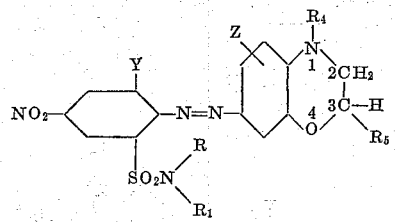

wherein R and R₁ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and

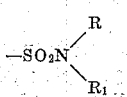

wherein R and R₁ have the meaning above given, R₄ represents an alkyl group, R₅ represents a member selected from the group consisting of hydrogen, alkyl and amino, wherein each of the hydrogen atoms attached to the carbon atoms of the phenmorpholine nucleus numbered 2 and 3 can be replaced by an alkyl group and wherein Z means that the benzene nucleus indicated can be substituted with a member selected from the group consisting of halogen, alkyl and alkoxy.

7. An azo compound selected from the group consisting of azo compounds having the general formulae:

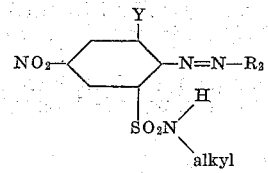

and

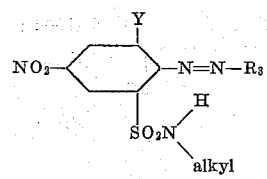

wherein Y represents a member selected from the group consisting of hydrogen, halogen, nitro, alkyl, alkoxy and

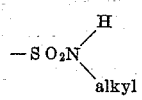

R₂ represents the residue of a tetrahydroquinoline nucleus joined through the carbon atom in its 6 position to the azo bond shown and R₃ represents the residue of a phenmorpholine nucleus joined through the carbon atom in its 6 position to the azo bond shown, said tetrahydroquinoline and phenmorpholine nuclei having their nuclear nitrogen atom substituted with an alkyl group.

8. An azo compound selected from the group consisting of azo compounds having the general formulae:

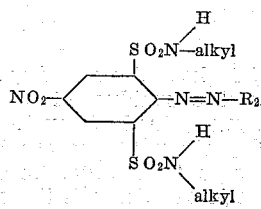

and

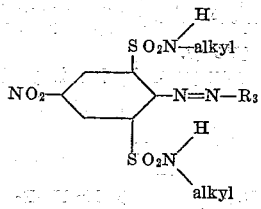

wherein R₂ represents the residue of a tetrahydroquinoline nucleus joined through the carbon atom in its 6 position to the azo bond shown and R₃ represents the residue of a phenmorpholine nucleus joined through the carbon atom in its 6 position to the azo bond shown, said tetrahydroquinoline and phenmorpholine nuclei having their nuclear nitrogen atom substituted with an alkyl group.

9. An azo compound selected from the group consisting of azo compounds having the general formulae:

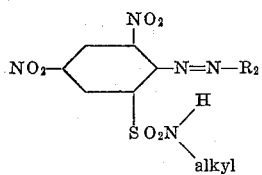

and

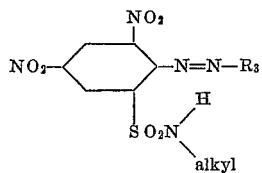

wherein $R_2$ represents the residue of a tetrahydroquinoline nucleus joined through the carbon atom in its 6 position to the azo bond shown and $R_3$ represents the residue of a phenmorpholine nucleus joined through the carbon atom in its 6 position to the azo bond shown, said tetrahydroquinoline and phenmorpholine nuclei having their nuclear nitrogen atom substituted with an alkyl group.

10. The azo compound having the formula:

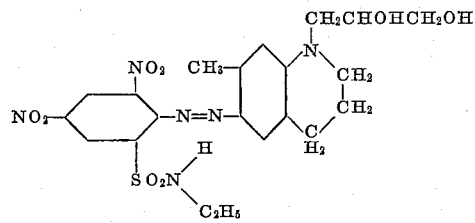

11. Material made of or containing an organic derivative of cellulose and in which said organic derivative of cellulose is colored with a nuclear non-sulfonated and non-carboxylated azo compound having the general formulae:

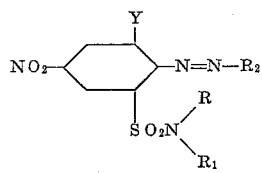

and

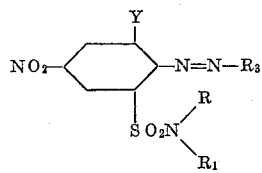

wherein $R$ and $R_1$ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and

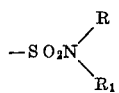

wherein $R$ and $R_1$ have the meaning above given, $R_2$ represents the residue of a tetrahydroquinoline nucleus joined through the carbon atom in its 6 position to the azo bond shown and $R_3$ represents the residue of a phenmorpholine nucleus joined through the carbon atom in its 6 position to the azo bond shown, said tetrahydroquinoline and phenmorpholine nuclei having their nuclear nitrogen atom substituted with an alkyl group.

12. Material made of or containing an organic derivative of cellulose and in which said organic derivative of cellulose is colored with a nuclear non-sulfonated and non-carboxylated azo compound selected from the group consisting of azo compounds having the general formulae:

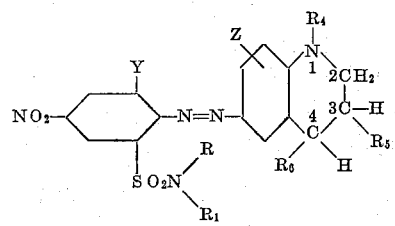

and

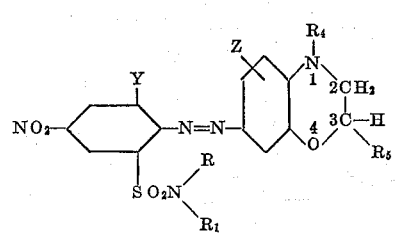

wherein $R$ and $R_1$ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and

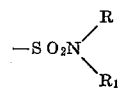

wherein $R$ and $R_1$ have the meaning above given, $R_4$ represents an alkyl group, $R_5$ and $R_6$ each represents a member selected from the group consisting of hydrogen, alkyl and amino, wherein each of the hydrogen atoms attached to the carbon atoms of the tetrahydroquinoline nucleus numbered 2, 3 and 4 and each of the hydrogen atoms attached to the carbon atoms of the phenmorpholine nucleus numbered 2 and 3 can be replaced by an alkyl group and wherein Z means that the benzene nuclei indicated can be substituted with a member selected from the group consisting of halogen, alkyl and alkoxy.

13. A cellulose acetate colored with a nuclear non-sulfonated and non-carboxylated azo compound selected from the group consisting of azo compounds having the general formulae:

and wherein $R$ and $R_1$ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and

wherein R and $R_1$ have the meaning above given, $R_2$ represents the residue of a tetrahydroquinoline nucleus joined through the carbon atom in its 6 position to the azo bond shown and $R_3$ represents the residue of a phenmorpholine nucleus joined through the carbon atom in its 6 position to the azo bond shown, said tetrahydroquinoline and phenmorpholine nuclei having their nuclear nitrogen atom substituted with an alkyl group.

14. A cellulose acetate colored with a nuclear non-sulfonated and non-carboxylated azo compound selected from the group consisting of azo compounds having the general formulae:

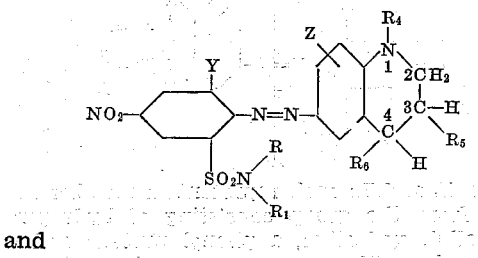

and

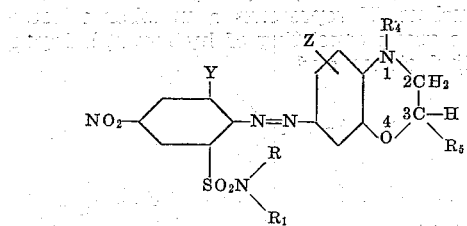

wherein R and $R_1$ each represents a member selected from the group consisting of hydrogen, alkyl, allyl, cycloalkyl, a phenyl nucleus and a furyl nucleus, Y represents a member selected from the group consisting of hydrogen, halogen, nitro, alkyl, alkoxy and

wherein R and $R_1$ have the meaning above given, $R_4$ represents an alkyl group, $R_5$ and $R_6$ each represents a member selected from the group consisting of hydrogen, alkyl and amino, wherein each of the hydrogen atoms attached to the carbon atoms of the tetrahydroquinoline nucleus numbered 2, 3 and 4 and each of the hydrogen atoms attached to the carbon atoms of the phenmorpholine nucleus numbered 2 and 3 can be replaced by an alkyl group and wherein Z means that the benzene nuclei indicated can be substituted with a member selected from the group consisting of halogen, alkyl and alkoxy.

15. A cellulose acetate colored with a nuclear non-sulfonated and non-carboxylated azo compound selected from the group consisting of azo compounds having the general formulae:

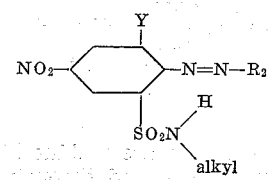

and

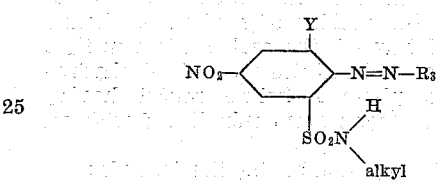

wherein Y represents a member selected from the group consisting of hydrogen, halogen, nitro, alkyl, alkoxy and

$R_2$ represents the residue of a tetrahydroquinoline nucleus joined through the carbon atom in its 6 position to the azo bond shown, and $R_3$ represents the residue of a phenmorpholine nucleus joined through the carbon atom in its 6 position to the azo bond shown, said tetrahydroquinoline and phenmorpholine nuclei having their nuclear nitrogen atom substituted with an alkyl group.

16. A cellulose acetate colored with the azo compound having the formula:

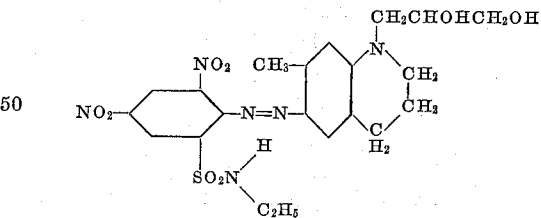

JAMES G. McNALLY.
JOSEPH B. DICKEY.

Certificate of Correction

Patent No. 2,251,947.　　　　　　　　　　　　　　　　　August 12, 1941.

JAMES G. McNALLY ET AL.

It is hereby certified that error appears in the printed specification of the above numbered patent requiring correction as follows: Page 3, first column, in the table, item 5 thereof, for "ethylamide-β-nitrobenzene" read *ethylamide-4-nitrobenzene*; and that the said Letters Patent should be read with this correction therein that the same may conform to the record of the case in the Patent Office.

Signed and sealed this 16th day of December, A. D. 1941.

[SEAL]

HENRY VAN ARSDALE,
*Acting Commissioner of Patents.*